(12) United States Patent
Takano

(10) Patent No.: US 10,440,191 B2
(45) Date of Patent: Oct. 8, 2019

(54) INFORMATION PROCESSING SYSTEM

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/088,447

(22) PCT Filed: Mar. 6, 2017

(86) PCT No.: PCT/JP2017/008662
§ 371 (c)(1),
(2) Date: Sep. 26, 2018

(87) PCT Pub. No.: WO2017/183329
PCT Pub. Date: Oct. 26, 2017

(65) Prior Publication Data
US 2019/0089842 A1    Mar. 21, 2019

(30) Foreign Application Priority Data

Apr. 21, 2016   (JP) .................. 2016-085543

(51) Int. Cl.
*H04M 15/00*   (2006.01)
*H04M 3/487*   (2006.01)
(Continued)

(52) U.S. Cl.
CPC ............ *H04M 15/64* (2013.01); *H04L 12/14* (2013.01); *H04L 67/10* (2013.01); *H04M 3/487* (2013.01);
(Continued)

(58) Field of Classification Search
CPC .................................................. H04M 15/64
(Continued)

(56) References Cited

U.S. PATENT DOCUMENTS 8,990,334 B2   3/2015   Barraclough et al.
9,077,816 B2   7/2015   Li et al.
(Continued)

FOREIGN PATENT DOCUMENTS

JP   10187267 A   7/1998
JP   2003319098 A  11/2003
(Continued)

OTHER PUBLICATIONS

English Translation of International Search Report and written Opinion for International Application No. PCT/JP2017/008662, dated May 16, 2017.

(Continued)

*Primary Examiner* — Joel Ajayi
(74) *Attorney, Agent, or Firm* — Xsensus LLP

(57) ABSTRACT

In a system in which a wireless access network and another network are connected to each other, an accurate fee is charged in a case where data held in an application server disposed in the wireless access network is used.

The application server holds an application and data relating to the application. A usage mode information generating unit generates usage mode information which is information relating to a usage mode when the wireless terminal uses the held data. A network data usage amount measuring unit measures a network data usage amount when the wireless terminal uses data on another network via a wireless access network connected to the wireless terminal. A fee charging unit charges a fee on the basis of the measured network data usage amount and charge a fee on a basis of the generated usage mode information.

9 Claims, 16 Drawing Sheets

(51) Int. Cl.
*H04M 11/00* (2006.01)
*H04W 4/24* (2018.01)
*H04L 12/14* (2006.01)
*H04L 29/08* (2006.01)

(52) U.S. Cl.
CPC ........... *H04M 11/00* (2013.01); *H04M 15/00* (2013.01); *H04M 15/58* (2013.01); *H04M 15/59* (2013.01); *H04M 15/8207* (2013.01); *H04W 4/24* (2013.01)

(58) Field of Classification Search
USPC ....................................................... 455/406
See application file for complete search history.

(56) References Cited

U.S. PATENT DOCUMENTS

2010/0318647 A1  12/2010  Savoor et al.
2013/0238473 A1   9/2013  Fan et al.

FOREIGN PATENT DOCUMENTS

| JP | 2009537909 A | 10/2009 |
| JP | 2013526113 A | 6/2013 |
| JP | 2014515222 A | 6/2014 |
| JP | 2014140103 A | 7/2014 |
| JP | 2015092748 A | 5/2015 |
| WO | 2006098037 A1 | 9/2006 |
| WO | 2012052341 A1 | 4/2012 |

OTHER PUBLICATIONS

Extended European Search Report dated Mar. 29, 2019, issued in corresponding European Application No. 17785672.1, 9 pages.

INFORMATION PROCESSING SYSTEM

TECHNICAL FIELD

The present technology relates to an information processing system. More specifically, the present technology relates to an information processing system configured to send/receive information using wireless communication.

BACKGROUND ART

A system in which a wireless access network and another network such as the Internet are connected to each other is conventionally used. One example of such a system is Long Term Evolution (LTE). In LTE, a wireless access network and another network are connected to each other via Evolved Packet Core (EPC), which is a core network. Further, all data is converted into packets that are based on an internet protocol (IP) and transferred. In such a system, a user who uses a wireless terminal can use an application provided by the Internet.

As a technology for improving usability when an application on the other network is used from the wireless access network in such a system, there has been proposed mobile edge computing (MEC). In MEC, a cache server that temporarily holds data associated with the application is provided within the wireless access network. Accessing the data held in this cache server can shorten time when transferring data to the wireless terminal and improve usability.

One proposed technology for the cache server is a system in which a local cache is provided to a wireless access network, and a fee is charged when a user uses data held in the local cache (see, for example, Patent Literature 1). In this system, a fee is charged when data such as content is provided from the network to the local cache.

CITATION LIST

Patent Literature

Patent Literature 1: JP 2015-92748A

DISCLOSURE OF INVENTION

Technical Problem

In the above-described conventional technology, a fee is charged when data is held in the local cache, but a fee is not charged when a user uses the data held in the local cache thereafter. Because of this, there is a problem in that a fee cannot be correctly charged in a case where, for example, the data held in the local cache of the wireless access network is used a plurality of times, and the like.

The present technology has been developed in light of such a problem and has an object to charge a fee according to a usage amount of data held in a cache server provided in a wireless access network.

Solution to Problem

The present technology has been devised to solve the above-described problem, and a first aspect thereof is an information processing system, including: an application server configured to hold an application and data relating to the application; a usage mode information generating unit configured to generate usage mode information which is information relating to a mode of use when the wireless terminal uses the held data; a network data usage amount measuring unit configured to measure a network data usage amount when the wireless terminal uses data of a server on another network via a wireless access network connected to the wireless terminal; and a fee charging unit configured to charge a fee on a basis of the measured network data usage amount and charge a fee on a basis of the generated usage mode information. This configuration results in an action of charging a fee on the basis of usage mode information.

In addition, according to this first aspect, the usage mode information generating unit may generate information indicating that the data held in the application server is being used as the usage mode information. This configuration results in an action of charging a fee in a case where data held in an application server is used.

In addition, according to this first aspect, the fee charging unit may charge a fee using a rate lower than a rate when the wireless terminal uses data on another network in a case where information indicating that the data held in the application server is being used is generated as the usage mode information. This configuration results in an action of charging a fee using a low rate when data held in an application server is used.

In addition, according to this first aspect, the usage mode information generating unit may generate information indicating that data is being transferred to the application server as the usage mode information. This configuration results in an action of charging a fee in a case where data is transferred to an application server.

In addition, according to this first aspect, the fee charging unit may charge a fee using a rate with a negative value in a case where information indicating that data is being transferred to the application server is generated as the usage mode information. This configuration results in an action of a charging a fee using a rate with a negative value in a case where data is transferred to an application server.

In addition, according to this first aspect, the usage mode information generating unit may generate a continuous period of time after startup of the held application as the usage mode information. This configuration results in an action of a charging a fee according to a continuous period of time after startup of an application executed in an application server.

In addition, according to this first aspect, the fee charging unit may charge a fee using a rate that is changed according to a continuous period of time after startup of the application in a case where a continuous period of time after startup of the application is generated as the usage mode information. This configuration results in an action of a changing a rate according to a continuous period of time after startup of an application.

In addition, according to this first aspect, the usage mode information generating unit may generate a number of handover occurrences as the usage mode information. This configuration results in an action of charging a fee according to a number of handover occurrences.

In addition, according to this first aspect, the usage mode information generating unit may generate information indicating that the application and the data held in the application server have not been used for a predetermined period of time as the usage mode information. This configuration results in an action of charging a fee in a case where an application or the like executed in an application server is not used for a predetermined period of time.

In addition, according to this first aspect, the fee charging unit may include a network data remaining balance management unit configured to manage a remaining balance of a usage fee paid in advance by a user of the wireless terminal according to fee charging based on the measured network data usage amount, a data remaining balance management unit configured to manage a remaining balance of the usage fee according to fee charging based on the generated usage mode information, and a fee charging management unit configured to determine the usage fee for the user on a basis of respective remaining balances managed by the network data remaining balance management unit and the data remaining balance management unit. This configuration results in an action of managing a remaining balance using a network data remaining balance management unit and a data remaining balance management unit.

In addition, a second aspect of the present technology is an information processing system, including: an application server configured to hold an application and data relating to the application; a usage mode information generating unit configured to generate usage mode information which is information relating to a mode of use when the wireless terminal uses the held data; a network data usage amount measuring unit configured to measure a network data usage amount when the wireless terminal uses data on another network via a wireless access network connected to the wireless terminal; a network data fee charging unit configured to charge a fee on a basis of the measured network data usage amount; and a fee charging unit configured to charge a fee on a basis of the generated usage mode information. This configuration results in an action of charging a fee using a network data fee charging unit and a data fee charging unit.

In addition, according to this second aspect, the data fee charging unit may be provided for each of a plurality of the application servers and charge a fee for each of the plurality of application servers. This configuration results in an action of charging a fee for each application server using a plurality of data fee charging units.

Advantageous Effects of Invention

The present technology can provide a superior effect of correctly charging a fee relating to the use of data held in a cache server provided in a wireless access network. Note that the effects described herein are not necessarily limitative and may refer to any one of the effects described in this specification.

MODE(S) FOR CARRYING OUT THE INVENTION

Modes (hereinafter referred to as "embodiments") for carrying out the present technology are described below. Description is given in the following order:

1. First embodiment (example of a case where a fee is charged for use of data in an application server)
2. Second embodiment (example of a case where a fee is charged for uploading to an application server)
3. Third embodiment (example of a case where a fee is charged on the basis of a continuous period of time after startup of an application in an application server)
4. Fourth embodiment (example of a case where a fee is charged on the basis of number of handover occurrences)
5. Fifth embodiment (example of a case where a fee is charged in a case where an application in an application server is not used)
6. Sixth embodiment (example of a case where remaining balances are managed by two ABMFs)
7. Seventh embodiment (example of a case where a fee is charged using two fee charging devices)
8. Modification example <1. First Embodiment>
[Configuration of Information Processing System]

Figure 1:
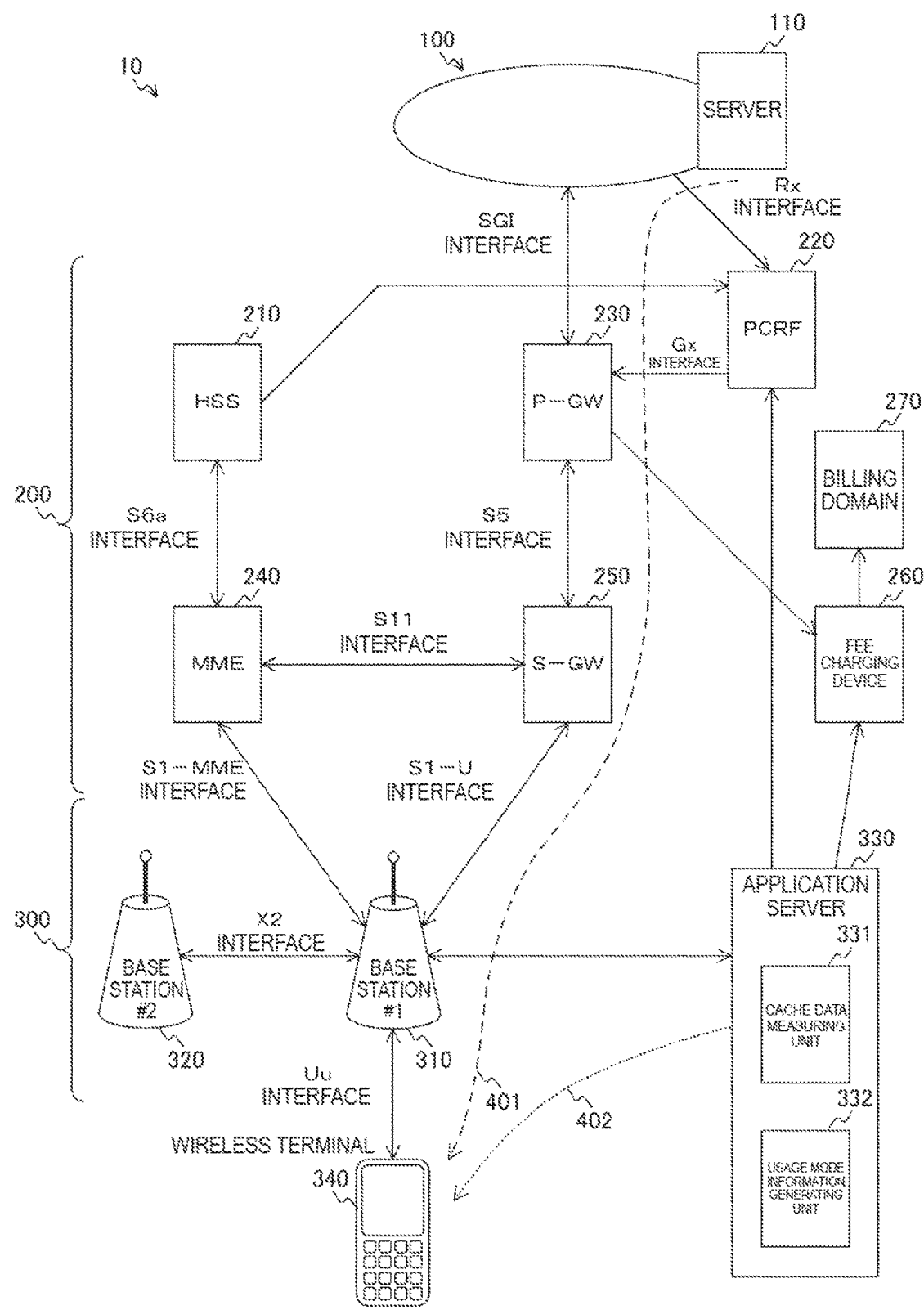
FIG. 1 is an illustration of an exemplary configuration of an information processing system 10 according to a first embodiment of the present technology.

FIG. 1 is an illustration of an exemplary configuration of an information processing system 10 according to a first embodiment of the present technology. The information processing system 10 includes a network 100, a core network 200 and a wireless access network 300.

The network 100 is a network that sends/receives packets that are based on an IP such as the Internet. The network 100 includes a server 110 that holds an application. This application corresponds to, for example, an application that broadcasts data of images and the like, for instance.

[Configuration of Core Network]

In FIG. 1, the core network 200 is a network that connects the network 100 to the wireless access network 300. EPC, for example, can be used as the core network 200. The core network 200 includes a home subscriber server (HSS) 210, a mobility management entity (MME) 240, a packet data network gateway (P-GW) 230, a serving gateway (S-GW) 250, a policy and charging rule function (PCRF) 220, a fee charging device 260 and a billing domain 270.

The HSS 210 and the MME 240 are connected to each other via an S6a interface. The MME 240 and the S-GW 250 are connected to each other via an S11 interface. The S-GW 250 and the P-GW 230 are connected to each other via an S5 interface. The P-GW 230 and the PCRF 220 are connected to each other via a Gx interface. In addition, the P-GW 230 and the network 100 are connected to each other via an SGI interface. The PCRF 220 and the network 100 are connected to each other via an Rx interface.

The HSS 210 holds subscriber information.

The MME 240 performs processing such as authentication management of a wireless terminal 340 that is connected to the wireless access network 300 and position management of the wireless terminal 340. The MME 240 performs processing on the basis of the subscriber information in the HSS 210.

The S-GW 250 performs relay processing of packets on the basis of the subscriber information.

The P-GW 230 connects the core network 200 and the network 100 to each other and controls packets. The P-GW 230 measures a network data usage amount that is a usage amount when a user of the wireless terminal 340 uses data of the network 100, for example, data of the server 110 via the wireless access network 300. As described later, the network data usage amount is measured on the basis of network data fee charging information supplied by the PCRF 220. Note that the P-GW 230 is an example of a network data usage amount measuring unit in the Claims.

The PCRF 220 generates the network data fee charging information and data fee charging information and supplies this information to the P-GW 230 and a fee charging device 260, respectively. Here, the network data fee charging information is information relating to charging a fee according to the network data usage amount. The data fee charging information is information relating to charging a fee according to a usage amount when the user or the like of the wireless terminal 340 uses data held in an application server 330 to be described later. Note that the usage amount of data held in the application server 330 is referred to as "data usage amount." A charging rule can be applied to the fee charging information.

The fee charging device 260 charges a fee on the basis of the network data usage amount measured by the P-GW 230 and the data usage amount measured by the cache data measuring unit 331 to be described later. Note that the fee charging device 260 is an example of a fee charging unit in the Claims.

The billing domain 270 bills a user who uses the wireless terminal 340 for a fee on the basis of a fee charging result from the fee charging device 260.

Details of measuring and charging the usage amount of data in the core network 200 are described later.

[Configuration of Wireless Access Network]

FIG. 1, the wireless access network 300 includes a base station #1 (310), a base station #2 (320), and the application server 330.

The base station #1 (310) and the MME 240 are connected to each other via an S1-MME interface. In addition, the base station #1 (310) and the S-GW 250 are connected to each other via an S1-U interface. Note that the base station #2 (320) is also connected in a similar way via these interfaces (not shown). Further, the base station #1 (310) and the base station #2 (320) are connected to each other via an X2 interface.

The base stations #1 (310) and #2 (320) connect the wireless terminal 340 to the wireless access network 300. As illustrated in FIG. 1, the wireless terminal 340 is connected to either the base station #1 (310) or #2 (320) via a Uu interface. Note that while two base stations are provided in FIG. 1, the present technology is not limited thereto and one base station or three or more base stations may be provided.

The application server 330 is provided for a wireless access network, and holds an application and data relating to the application. The application and the data relating to the application are normally held in the server 110. If envisioning an application that broadcasts videos, for example, the data corresponds to a video file and using the data corresponds to an act of downloading the video file. When a user downloads the video tile, the video file is transmitted via a pathway 401 represented by the dashed line in FIG. 1. In this case, the time required for downloading increases because transmission is carried out via the P-GW 230 and the S-GW 250.

In order to solve this problem, the video file is held in the application server 330 and the video file is downloaded via a pathway 402 represented by the broken line in FIG. 1. With this configuration, the time required for downloading can be reduced. In this way, the application server 330 holds the data and the held data is used by a user of the wireless terminal 340. Note that one application server 330 can be provided for every base station.

In addition, the application server 330 in FIG. 1 includes a cache data measuring unit 331 and a usage mode information generating unit 332. The cache data measuring unit 331 measures a data usage amount. An MCE charging entity (MCE) can be used for the cache data measuring unit 331. The usage amount of data can be measured using the P-GW 230 in a case where the user uses the data held in the server 110. In the above-described example, the usage amount of data when the video file is downloaded along the pathway 401 can be measured using the P-GW 230. This is because the video file is transmitted via the P-GW 230. However, when the user uses the data, held in the application server 330, the P-GW 230 is unable to grasp usage of data and cannot perform measurement.

In order to deal with this, the application server 330 measures a usage amount (data usage amount) of data held in the application server 330. Then, a measurement result is sent to the fee charging device 260, to thereby enable a fee to be charged in a case where the data held in the application server 330 is used. Before this step, the application server 330 sends a fee charging request to the fee charging device 260 and notifies the fee charging device 260 of start of use of the data held in the application server 330. Note that embodiments of the present technology are not limited to the configuration in FIG. 1. For example, there can be adopted a configuration in which the application server 330 is disposed between the S-GW 250 and the base station #1 (310). Note that configurations of the cache data measuring unit 331 and the usage mode information generating unit 332 are described in detail later.

[Configuration of Area for Charging a Fee]

Figure 2:
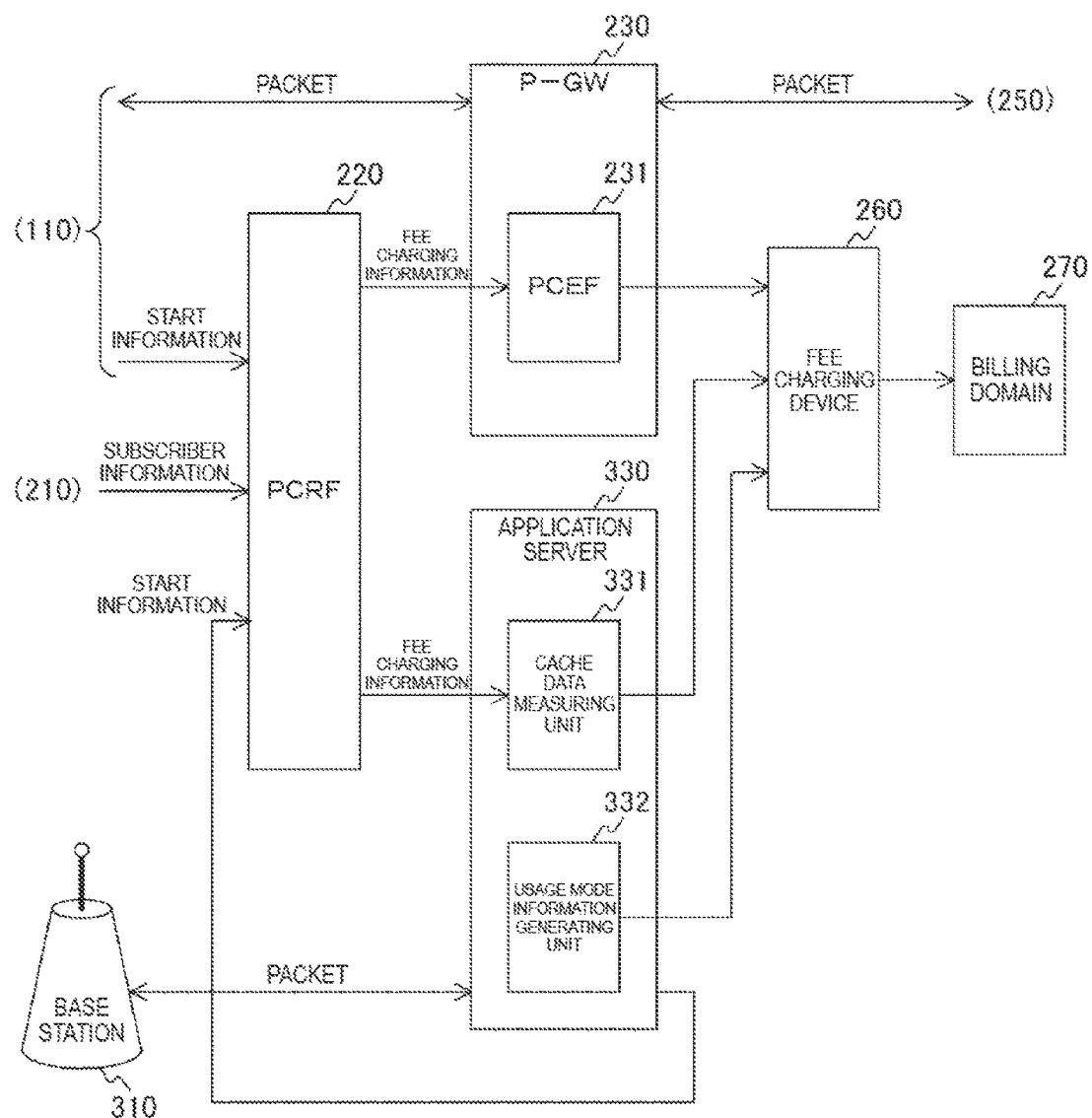
FIG. 2 is an illustration of an exemplary configuration of an area for charging a fee according to the first embodiment of the present technology.

FIG. 2 is an illustration of an exemplary configuration of an area for charging a fee according to the first embodiment of the present technology. FIG. 2 illustrates details of a configuration of a portion in FIG. 1 that is involved with charging a fee.

The P-GW 230 in FIG. 2 includes a policy and charging enforcement function (PCEF) 231. The PCEF 231 measures a network data usage amount on the basis of network data fee charging information supplied by the PCRF 220. The network data usage amount can be measured by for example, measuring the number of packets transmitted via the P-GW 230.

The application server 330 in FIG. 2 includes the cache data measuring unit 331 and the usage mode information generating unit 332.

The cache data measuring unit 331 measures a held data usage amount on the basis of data fee charging information output from the PCRF 220. The data usage amount can be measured by, for example, measuring the number of packets sent/received between the application server 330 and the base station 310. The measured data usage amount is sent to the fee charging device 260.

The usage mode information generating unit 332 generates usage mode information which is information relating to a mode of use when a user or the like of the wireless terminal 340 uses the data held in the application server 330. The usage mode information is sent to the fee charging device 260 together with the above-mentioned data usage amount. The mode of use corresponds to, for example, information indicating that the user of the wireless terminal 340 will use the data held in the application server 330. In this case, usage mode information is sent to the fee charging device 260 each time the data held in the application server 330 is used.

The PCRF 220 acquires, as the subscriber information from the HSS 210, information relating to a service permitted by the wireless terminal 340 of a subscriber and fee charging for the wireless terminal 340 of the subscriber. Then, fee charging information is generated on the basis of this information. A fee charging rule can be applied to the fee charging information. For example, specifying a fee charging method or an ID for identifying an application, information relating to a flow of data for which the data usage amount is to be measured, or the like corresponds to the fee charging illumination.

The fee can be charged as follows in a case where a user uses the data of the server 110. First, start information indicating that data usage is to start is sent from an application of the server 110 to the PCRF 220. The PCRF 220 generates fee charging information (network data fee charging information) on the basis of the start information and the subscriber information output from the HSS 210, and supplies the fee charging information to the PCEF 231 of the P-GW 230. After the fee charging information is supplied to the PCEF 231, the PCEF 231 begins to measure the network data usage amount. Then, a measurement result is sent to the first fee charging device 260 and a fee is charged for the use of data of the server 110.

On the other hand, the fee can be charged as follows in a case where the user uses the data of the application server 330. First, start information indicating that data usage is to start is sent from the application server 330 to the PCRF 220. The PCRF 220 generates fee charging information (data fee charging information on the basis of the start information and the subscriber information output from the HSS 210, and supplies the fee charging information to the cache data measuring unit 331. After the fee charging information is supplied to the cache data measuring unit 331, the cache data, measuring unit 331 begins to measure the data usage amount. Then, a measurement result is sent to the fee charging device 260. In addition, the usage mode information generating unit 332 generates usage mode information and sends this information to the fee charging device 260. Thereafter, the fee charging device 260 charges a fee for use of the data held in the application server 330.

The measurement of the network data usage amount and the measurement of the data usage amount can be performed simultaneously or separately according to how the data is used. For example, only the network data usage amount is measured in a case where the user of the wireless terminal 340 uses the data of the server 110. Only the data usage amount is measured in a case where the user of the wireless terminal 340 or a business that runs an over-the-top business uploads data to the application server 330. In addition, only the data usage amount is measured even in a case where the user of the wireless terminal 340 sends/receives data relating to an application such as a game to/from the application server 330. Both the network data usage amount and the data usage amount are measured in a case where the user of the wireless terminal 340 uses the data of the server 110 and that data is held in the application server 330.

[Configuration of First Fee Charging Device]

Figure 3:
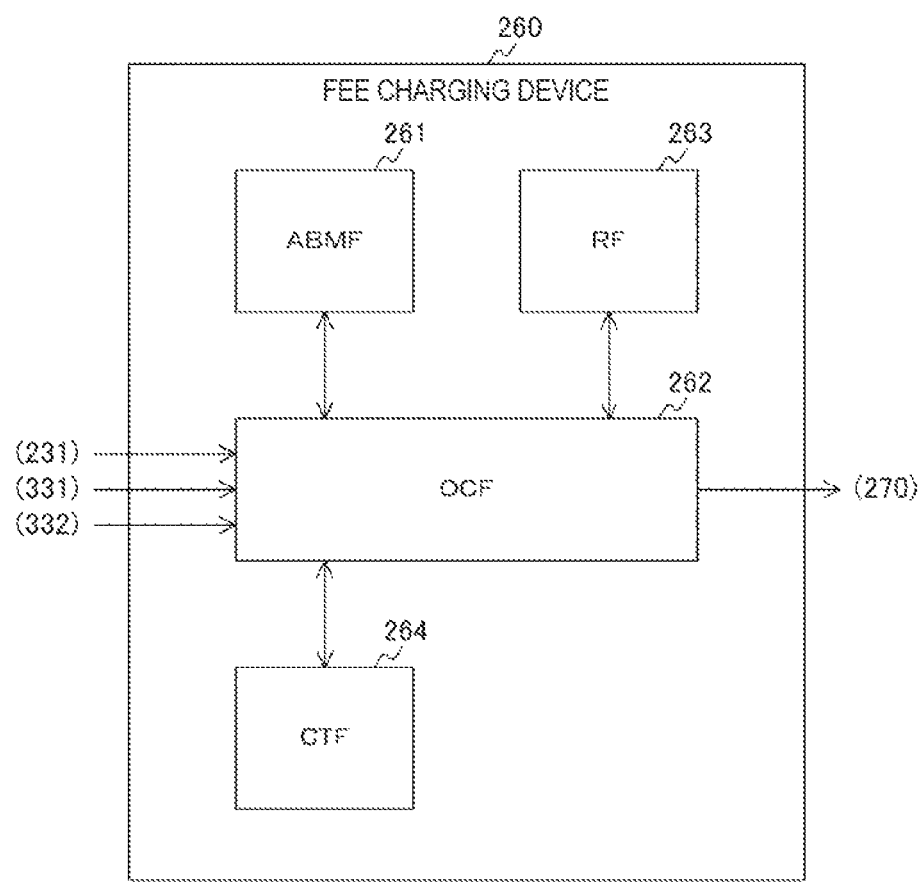
FIG. 3 is an illustration of an exemplary configuration of a fee charging device 260 according to the first embodiment of the present technology.

FIG. 3 is an illustration of an exemplary configuration of the fee charging device 260 according to the first embodiment of the present technology. A fee charging device 260 in FIG. 3 that performs online fee charging. Herein, "online fee charging" refers to a method of charging a fee in which a fee is charged each time a network is used.

The fee charging device 260 includes an account balance management function (ABMF) 261, an online fee charging function (OCF) 262, a rating function (RF) 263 and a fee charging trigger function (CTF) 264.

The ABMF 261 manages a remaining balance of the subscriber. In FIG. 3, the remaining balance of a user of the wireless terminal 340 is managed. Here, "remaining balance" refers to a balance of a network usage fee previously purchased by the subscriber. The ABMF 261 manages the remaining balance on the basis of a result of fee charging performed by the OCF 262 to be described later.

The RF 263 determines the rate and outputs the rate to the OCF 262. Here, "rate" refers to a ratio between the usage amount of data and a fee and, for instance, corresponds to a usage fee per packet.

The CTF 264 detects occurrence of a paid event. In addition, the CTF 264 further includes a function of stopping the subscriber from using the network in a case where the account balance has run out due to using the network.

The OCF 262 controls the entire fee charging device 260 and executes online fee charging. When usage amounts of data are sent from the P-GW 230 and the cache data measuring unit 331, the OCF 262 authenticates usage of this data. Next, a fee is charged on the basis of the sent usage amounts of data and a rate output from the RF 263. At this time, the OCF 262 further changes a fee charging scheme on the basis of usage mode information sent from the usage mode information generating unit 332. Then, a fee charging result is sent to the ABMF 261. In addition, the OCF 262 sends information relating to a remaining balance or the like managed by the ABMF 261 to the billing domain 270.

Note that when a fee charging request for use of the data in the application server 330 is sent, the OCF 262 checks the remaining balance held in the ABMF 261 and determines whether or not data, can be sent/received. Then, an amount of available data (available data amount) can be calculated and sent to the application server 330. In addition, a fee can also be determined for the available data amount.

The core network 200 has less load in a case where a user uses data held in the application server 330 compared to a case where a user uses data held in the server 110. This is because there is no need to transfer data via the P-GW 230 and the S-GW 250. Therefore, a low usage fee can be set in relation to using data this way. In this case, the OCF 262 ascertains that the data held in the application server 330 is being used through the usage mode information sent from the usage mode information generating unit 332 and lowers the rate for such use. With this configuration, a low usage rate can be set.

[Setting Usage Fee]

Figure 4:
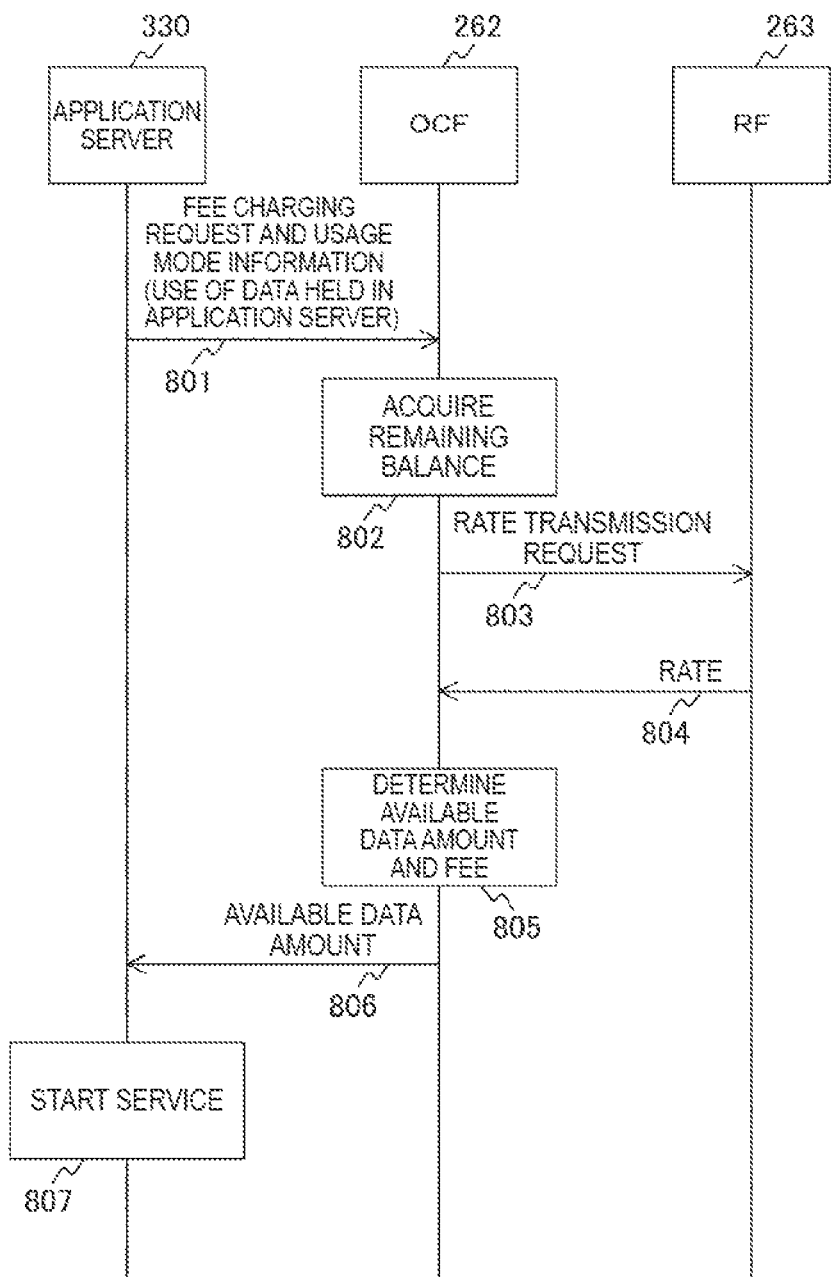
FIG. 4 is an illustration of an exemplary sequence for setting a usage fee according to the first embodiment of the present technology.

FIG. 4 is an illustration of an exemplary sequence for setting a usage fee according to the first embodiment of the present technology. First, the fee charging request and the usage Mode information are sent from the application server 330 to the OCF 262 (801). An ID for identifying the wireless terminal 340 is included in the fee charging request. In addition, the usage mode information is information representing use of the data held in the application server 330. The OCF 262 that has received the fee charging request and the usage mode information acquires a remaining balance (802). More specifically, a remaining balance of the user of the wireless terminal 340 is acquired from the ABMF 261. Next, the OCF 262 sends a rate transmission request to the RF 263 (803). The RF 263 that has received the rate transmission request sends a rate to the OCF 262 (804). The OCF 262 that has received the rate determines an available data amount and a fee on the basis of the acquired balance and the received rate (805) and sends the available data amount to the application server 330 (806). Then, a service is started (807) in the application server 330 that has received the available data amount, and data use or the like is executed.

In this way, in the first embodiment of the present technology, the usage mode information generating unit 332 generates information indicating that the data held in the application server 330 is being used as the usage mode information and a fee is charged on the basis of this generated usage mode information. With this configuration, an accurate fee can be charged for use of data held in an application server.

<2. Second Embodiment>

In the above-described first embodiment, information indicating that the data held in the application server 330 is being used is generated as the usage mode information. In contrast, in a second embodiment of the present technology information indicating that data is being uploaded to the application server 330 is generated as the usage mode information. The second embodiment differs from the first embodiment in that a rate when data is uploaded to the application server 330 is changed.

[Configuration of Area for Charging a Fee]

In a case where a user or the like of the wireless terminal 340 uploads data to the application server 330, the usage mode information generating unit 332 according to the second embodiment of the present technology generates information indicating that data is being uploaded as the usage mode information. In other words, information indicating that data is being transferred to the application server 330 is generated as the usage mode information. For example, there is envisioned a case in which a business that runs an over-the-top (OTT) business executes an application in the application server 330 and a user of the wireless terminal 340 uploads useful data relating to the application. In this case, in a case where the OTT business financially compensates the user of the wireless terminal 340 who uploads the useful data, the OTT business can compensate the user by setting the rate as a negative value, for example. In addition, for example, a method can be adopted in which the usage fee is made free by not charging the user a fee.

Then the usage mode information generating unit 332 generates usage mode information indicating that such data is being uploaded and sends this information to the fee charging device 260. The OCF 262 of the fee charging device 260 that has received the usage mode information charges a fee by, for example, setting a rate with a negative value. By increasing the remaining balance of the user of the wireless terminal 340, the user who uploaded the data can be financially compensated. Note that in a case where an upper limit is set for the financial compensation, the upper limit can be set by notifying the application server 330 of an uploadable amount of data

[Setting Usage Fee]

Figure 5:
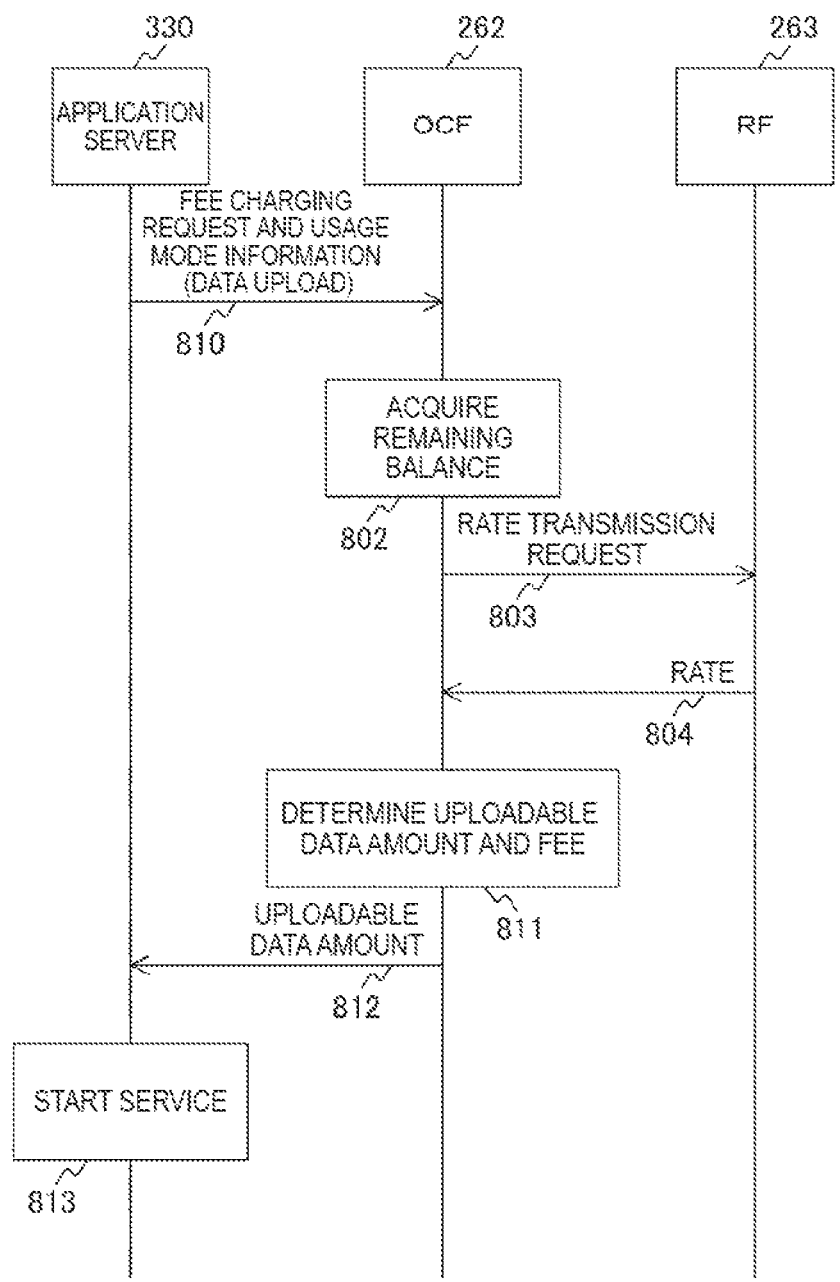
FIG. 5 is an illustration of an exemplary sequence for setting a usage fee according to the second embodiment of the present technology.

FIG. 5 is an illustration of an exemplary sequence for setting a usage fee according to the second embodiment of the present technology. Note that processing that is the same as the above-described processing in FIG. 4 is denoted by the same reference signs. First, the fee charging request and the usage mode information are sent from the application server 330 to the OCF 262 (810). The usage triode information is information indicating upload of data to the application server 330. The OCF 262 that has received the fee charging request and the usage mode information acquires a remaining balance (802). Next, the OCF 262 sends a rate transmission request to the RF 263 (803). The RF 263 that has received the rate transmission request sends a rate to the OCF 262 (804). The OCF 262 that has received the rate determines the rate and an uploadable amount of data on the basis of the acquired balance and the received rate, and also an amount of financial compensation for the uploaded data (811). The determined uploadable amount of data is sent to the application server 330 (812). Then, a service is started (813) in the application server 330 that has received the uploadable amount of data.

Other components of the information processing system 10 are similar to the components of the information processing system 10 described in the first embodiment of the present technology, and hence a description of those components is omitted.

In this way, in the second embodiment of the present technology, the usage mode information generating unit 332 generates information indicating that data is being uploaded to the application server 330 as the usage mode information, and a fee is charged on the basis of the generated usage mode information. With this configuration, a user who uploads data can be financially compensated.

<3. Third Embodiment>

In the above-described first embodiment, information indicating that the data held in the application server 330 is being used is generated as the usage mode. In contrast, in a third embodiment of the present technology, a continuous period of time after startup of an application held in the application server 330 is generated as the usage mode. The third embodiment differs from the first embodiment in that the rate is changed according to the continuous period of time after startup of the application held in the application server 330.

[Configuration of Area for Charging a Fee]

The usage mode information generating unit 332 according to the third embodiment of the present technology generates a continuous period of time after startup of an application held in the application server 330 as the usage mode information. The application server 330 is a resource of a business that operates a network business. In the application server 330, the rate is increased in a case where the user or the OTT business executes an application for a long period of time. With this configuration, long-term use of the application by a user or the like can be reduced, and assets such as the application server 330 can be used effectively.

The OCF 262 of the fee charging device that has received the continuous period of time after startup of the application held in the application server 330 as the usage mode information changes the rate acquired from the RF 263 to a higher rate and charges a fee.

[Setting Usage Fee]

Figure 6:
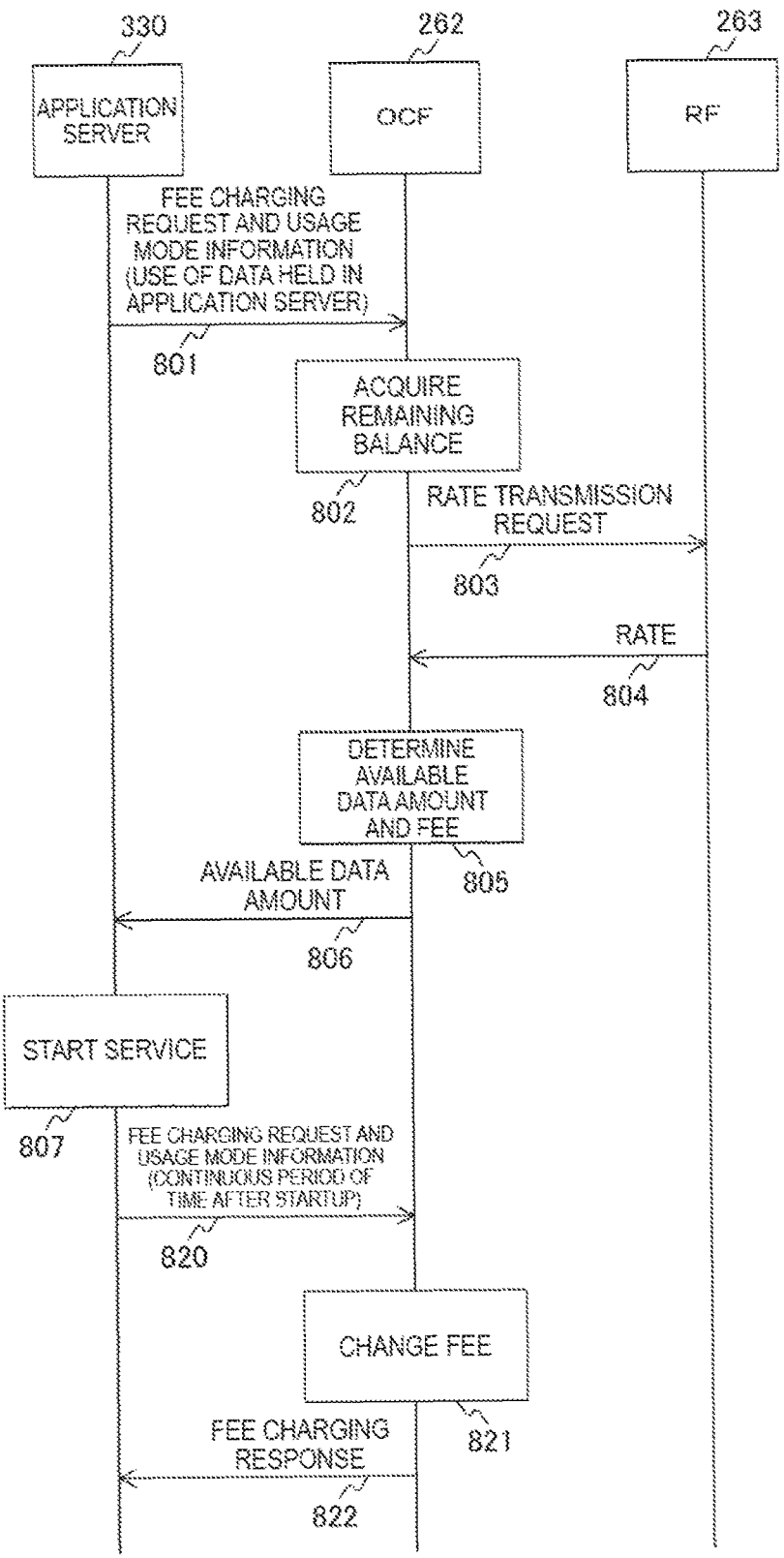
FIG. 6 is an illustration of an exemplary sequence for setting a usage fee according to the third embodiment of the present technology.

FIG. 6 is an illustration of an exemplary sequence for setting a usage fee according to the third embodiment of the present technology. Note that the processing from 801 to 807 is similar to the above-described processing in FIG. 4, and hence this processing is not described.

After starting the service (807), the fee charging request and the usage mode information are sent from the application server 330 to the OCF 262 (820). The usage mode information is a continuous period of time after startup of an application relating to the use. The OCF 262 that has received the fee charging request and the usage mode information changes the rate according to the continuous period of time after startup. Then, the fee is recalculated on the basis of the changed rate and the fee is changed (821). Thereafter, a new fee is sent to the application server 330 as a fee charging response (822).

Other components of the information processing system 10 are similar to the components of the information processing system 10 described in the first embodiment of the present technology, and hence a description of those components is omitted.

In this way, in the third embodiment of the present technology the usage mode information generating unit 332 generates a continuous period of time after startup of an application as the usage mode information and charges a fee on the basis of the generated usage mode information. With this configuration, a user or the like who uses an application for a long period of time can be charged a fee that has a high rate.

<4. Fourth Embodiment>

In the above-described first embodiment, information indicating that the data held in the application server 330 is being used is generated as the usage mode. In contrast, in a fourth embodiment of the present technology, movement frequency is generated as the usage mode in a case where the wireless terminal 340 uses data in another application server due to the wireless terminal 340 moving. The fourth embodiment differs from the first embodiment in that a plurality of application servers are provided, and the rate is changed according to the movement frequency of the wireless terminal 340.

[Configuration of Wireless Access Network]

Figure 7:
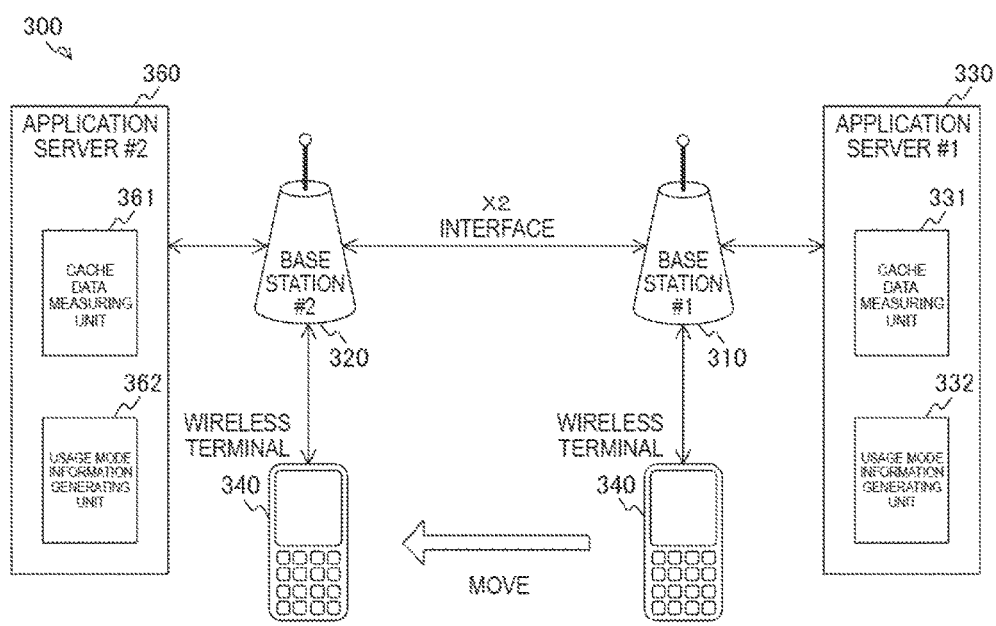
FIG. 7 is an illustration of an exemplary configuration of a wireless access network 300 according to a fourth embodiment of the present technology.

FIG. 7 is an illustration of an exemplary configuration of the wireless access network 300 according to the fourth embodiment of the present technology. FIG. 7 illustrates the configuration of part of the wireless access network 300 in the above-described information processing system 10 in FIG. 1. The wireless access network in FIG. 7 differs from the above-described wireless access network 300 in FIG. 1 in the following ways. The wireless access network 300 in FIG. 7 further includes the application server #2 (360) connected to the base station #2 (320). The application server #2 (360) includes a cache data measuring unit 361 and a usage mode information generating unit 362.

Figure 8:
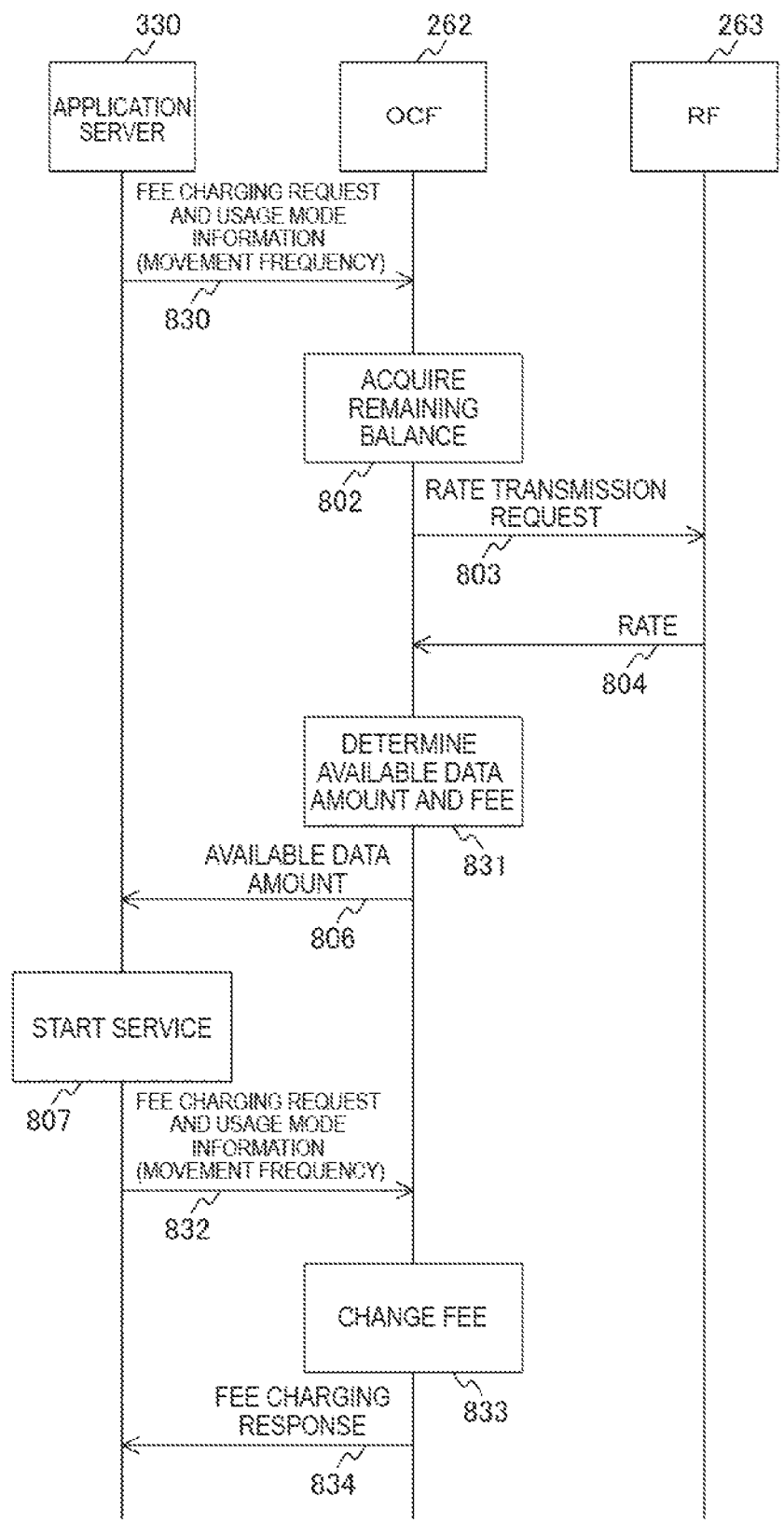
FIG. 8 is an illustration of an exemplary sequence for setting a usage fee according to the fourth embodiment of the present technology.

In addition, FIG. 8 further illustrates an example of a case where handover has occurred. Herein, "handover" refers to a function of automatically switching a connected base station in response to movement of the wireless terminal 340 and continuing communication. FIG. 8 illustrates an example of a case where the wireless terminal 340 that is connected to the base station #1 (310) has moved into the cell region of the base station #2 (320). At this time, the wireless terminal 340 after moving is automatically connected to the base station #2 (320) and can continuously communicate data. When handover occurs, in a case where the wireless terminal 340 was using data held in the application server #1 (330), the wireless terminal 340 can continuously use the data by connecting to the application server #2 (360).

[Configuration of Area for Charging a Fee]

The usage mode information generating unit 332 according to the fourth embodiment of the present technology generates movement frequency, which is a number of times the wireless terminal 340 is handed over, as the usage mode information. Handover causes network load to increase because the route changes. To deal with this, the rate is increased for a user who frequently repeats handover, and hence an appropriate user load can be requested. Note that the user load can be requested from the OTT business that provides the application to the user.

The OCF 262 of the fee charging device that has received the movement frequency as the usage mode information changes the rate acquired from the RF 263 to a higher rate and charges a fee.

[Setting Usage Fee]

FIG. 8 is an illustration of an exemplary sequence for setting a usage fee according to the fourth embodiment of the present technology. Note that processing that is the same as the above-described processing in FIG. 4 is denoted by the same reference signs. First, the fee charging request and the usage mode information are sent from the application server 330 to the OCF 262 (830). The usage mode information is the movement frequency of the wireless terminal 340. The OCF 262 that has received the fee charging request and the usage mode information acquires a remaining balance (802). Next, the OCF 262 sends a rate transmission request to the RF263 (803). The RF 263 that has received the rate transmission request sends a rate to the OCF 262 (804). The OCF 262 that has received the rate determines the fee and an available data amount on the basis of the acquired balance and the received rate, and also the movement frequency (831). The determined available data amount is sent to the application server 330 (806). Then, a service is started in the application server 330 that has received the available data amount (807).

After starting the service (807), the usage mode information indicating the movement frequency is sent from the application server 330 to the OCF 262 together with the fee charging request (832). The OCF 262 that has received the fee charging request and the usage mode information changes the rate according to the movement frequency. Then, the fee is recalculated on the basis of the changed rate and the fee is changed (833). Thereafter, a new fee is sent to the application server 330 as a fee charging response (834).

Note that the first step of sending the fee charging request and the usage mode information (830) in FIG. 8 can also be the above-described step in FIG. 4 of sending information indicating use of the data held in the application server 330 as the usage mode information (801).

Other components of the information processing system 10 are similar to the components of the information processing system 10 described in the first embodiment of the present technology and hence a description of those components is omitted.

In this way in the fourth embodiment of the present technology, the usage mode information generating unit 332 generates the movement frequency of the wireless terminal 340 as the usage mode information and a fee is charged on the basis of the generated usage mode information. With this configuration, a high rate can be charged in a case where handover is frequently repeated.

<5. Fifth Embodiment>

In the above-described first embodiment, information indicating that data held in the application server 330 is being used is generated as the usage mode. In contrast, in a fifth embodiment of the present technology, information indicating that an application held in the application server 330 has not been used for a predetermined period of time is generated as the usage mode. The fifth embodiment differs from the first embodiment in that a fee is charged even in a case where an application held m the application server 330 is not used.

[Configuration of Area for Charging a Fee]

The usage mode information generating unit 332 according to the fifth embodiment of the present technology generates information indicating that an application held in the application server 330 has not been used for a predetermined period of time as the usage mode information. In a case where the application and data relating to the application held in the application server 330 are not used, a fee charging request is not sent from the application server 330 and a fee is not charged. However, the usage mode information generating unit 332 generates information indicating that the application and the data have not been used for a predetermined period of time as the usage mode information and sends this information to the fee charging device 260. With this configuration, the user of the wireless terminal 340 or the OTT business can be charged a fee. In addition, a non-use period, which is a period of time in which the application or the like held in the application server 330 is not used, can also be generated as the usage mode information. In this case, the rate can be increased according to the non-use period.

The OCF 262 of the fee charging device that has received, as the usage mode information, the information indicating that the application and data held in the application server 330 have not been used for a predetermined period of time charges a fee to the user or the like of the wireless terminal 340.

[Setting Usage Fee]

Figure 9:
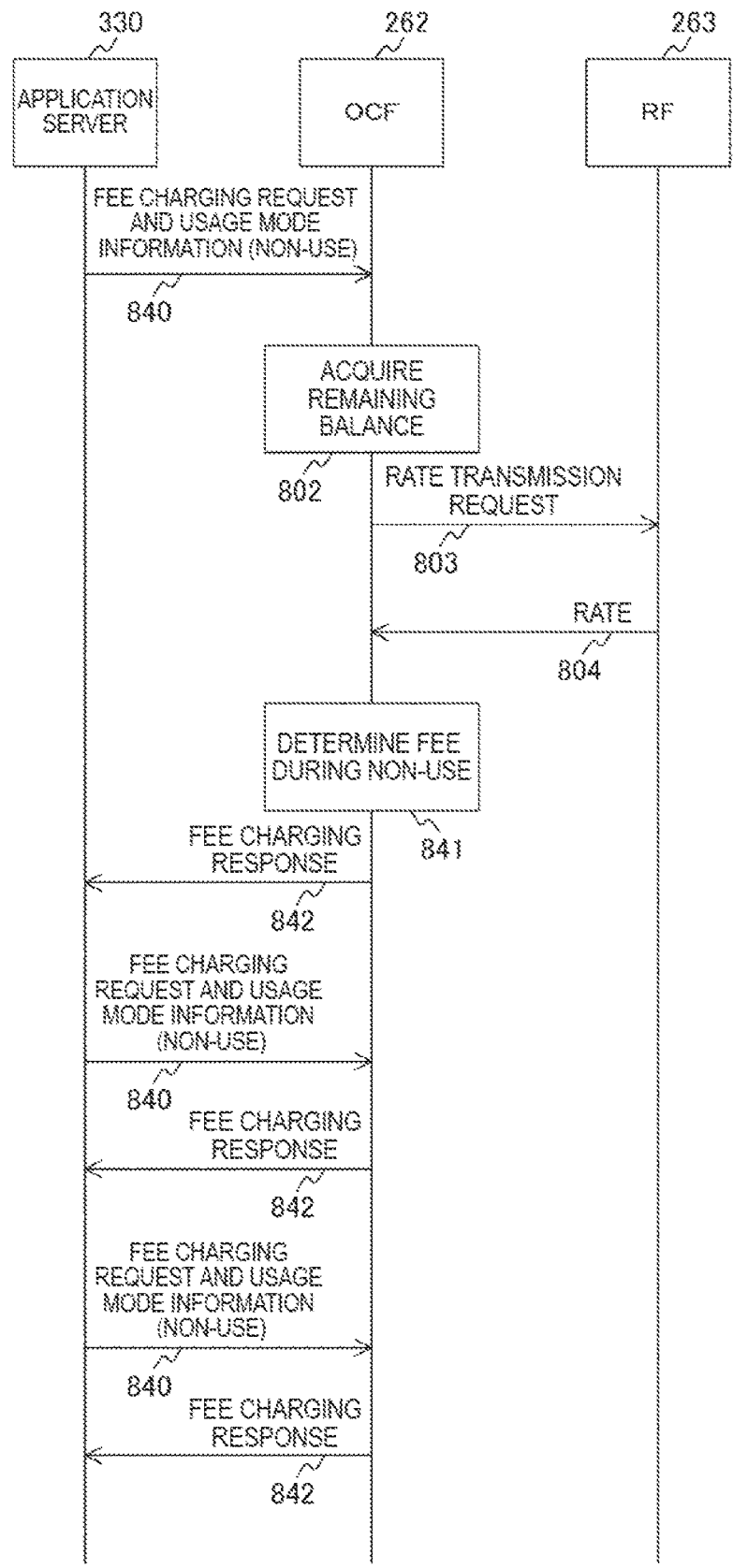
FIG. 9 is an illustration of an exemplary sequence for setting a usage fee according to the fifth embodiment of the present technology.

FIG. 9 is an illustration of an exemplary sequence for setting a usage fee according to the fifth embodiment of the present technology. Note that processing that is the same as the above-described processing in FIG. 4 is denoted by the same reference signs. First, the fee charging request and the usage mode information are sent from the application server 330 to the OCF 262 (840). An ID for identifying the application or the like is included in the fee charging request. In addition, the usage mode information is information indicating that an application and data relating to the usage has not been used for a predetermined period of time. The OCF 262 that has received the fee charging request and the usage mode information acquires a remaining balance (802). Next, the OCF 262 sends a rate transmission request to the RF 263 (803). The RF 263 that has received the rate transmission request sends a rate to the OCF 262 (804). The OCF 262 that has received the rate determines a fee for non-use (841) and sends the determined fee to the application server 330 as a fee charging response (842). An ID that is the same as the ID included in the above-mentioned fee charging request is included in the fee charging response.

Further, in a case where the application and data held in the application server 330 are not used, a fee is charged by repeating communication between the steps 840 and 842 each time a predetermined period of time elapses.

Figure 10:
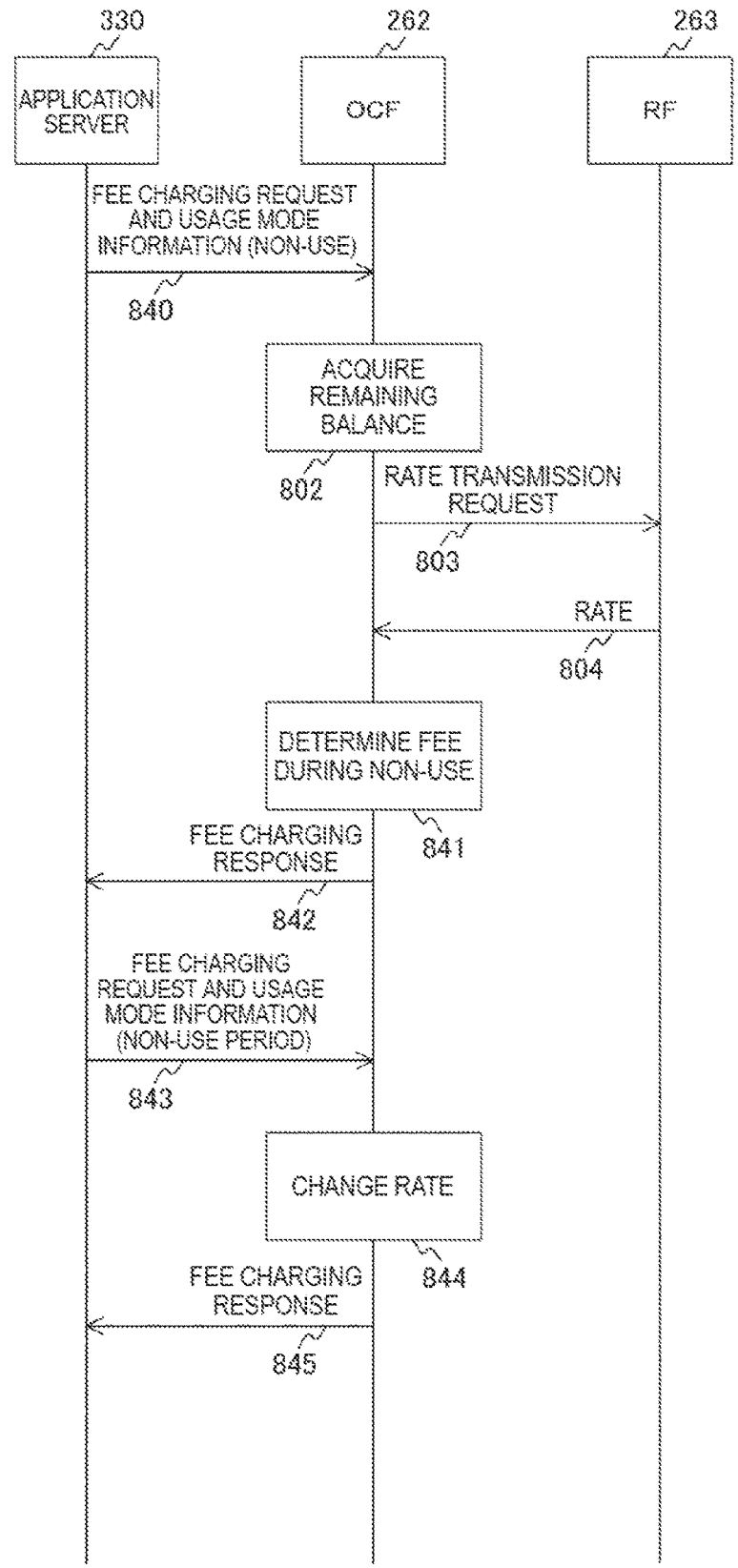
FIG. 10 is an illustration of another exemplary sequence for setting a usage fee according to the fifth embodiment of the present technology.

FIG. 10 is an illustration of another exemplary sequence for setting a usage fee according to the fifth embodiment of the present technology. Note that the processing from 840 to 842 is similar to the above-described processing in FIG. 9, and hence this processing is not described.

After the fee charging response is sent to the application server 330 (842), the fee charging request and the usage mode information are sent from the application server 330 to the OCF 262 (843) in a case where the application and data held in the application server 330 are still not used. The usage mode information is the non-use period. The OCF 262 that has received the fee charging request and the usage mode information changes the rate according to the non-use period. Then, the fee is recalculated on the basis of the changed rate and the fee is changed (844). Thereafter, a new fee is sent to the application server 330 as a fee charging response (845).

Other components of the information processing system 10 are similar to the components of the information processing system 10 described in the first embodiment of the present technology, and hence a description of those components is omitted.

In this way, in the fifth embodiment of the present technology, information indicating that an application or the like is not being used is generated as the usage mode information and a fee is charged on the basis of the generated usage mode information. With this configuration, a fee can be charged even in a case where an application or the like held in the application server 330 is not used.

<6. Sixth Embodiment>

In the above-described first embodiment, in the fee charging device 260, one ABMF manages the remaining balances. In contrast, in a sixth embodiment of the present technology, different ABMFs manage a remaining balance according to usage of network data and manage a remaining balance according to usage of data held in the application server. The sixth embodiment differs from the first embodiment in that remaining balances are separately managed by two ABMFs.

[Configuration of Fee Charging Device]

Figure 11:
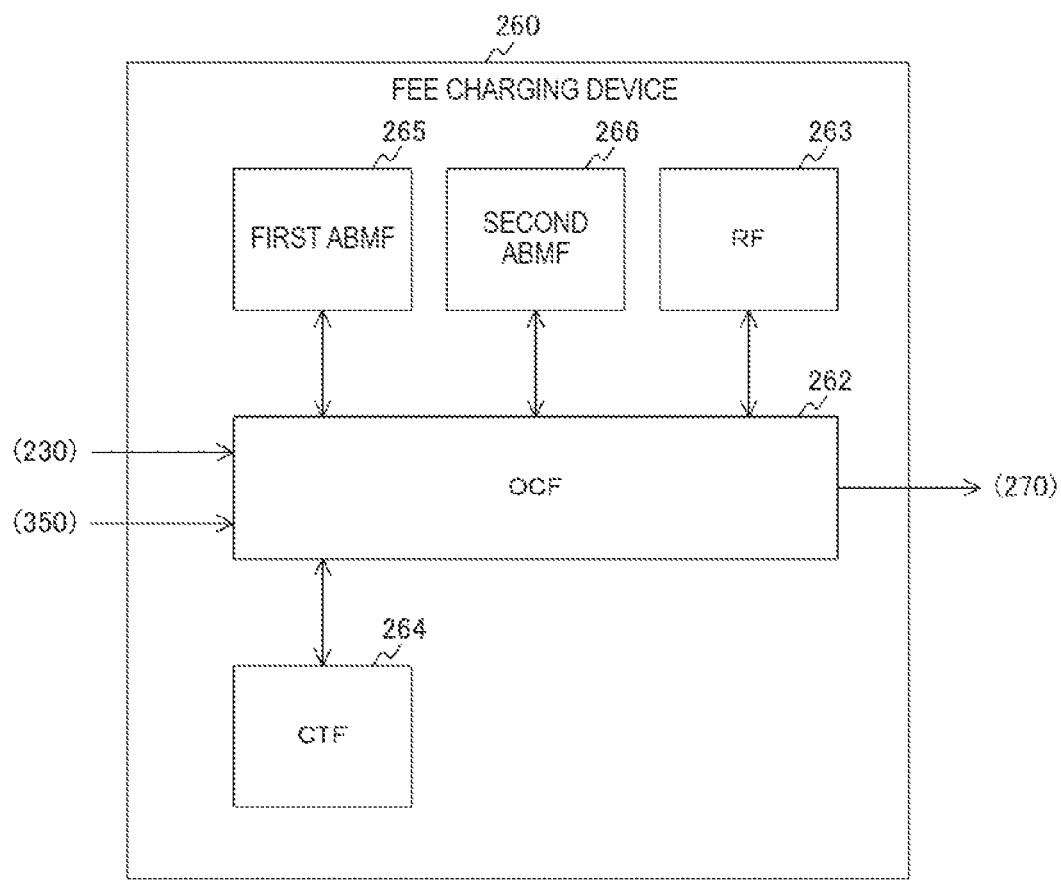
FIG. 11 is an illustration of an exemplary configuration of a fee charging device 260 according to a sixth embodiment of the present technology.

FIG. 11 is an illustration of an exemplary configuration of a fee charging device 260 according to the sixth embodiment of the present technology. The fee charging device 260 in FIG. 11 differs from the above-described fee charging device 260 in FIG. 3 in that a first ABMF 265 and a second ABMF 266 are provided in place of the ABMF 261.

The first ABMF 265 manages the remaining balance of a usage fee paid in advance according to charging a fee on the basis of a network data usage amount. Further, the second ABMF 266 manages the remaining balance of a usage fee paid in advance according to charging a fee on the basis of the usage mode information. When a data usage amount is sent from the P-GW 230, the OCF 262 charges a fee on the basis of the data usage amount and outputs a fee charging result to the first ABMF 265. The first ABMF 265 manages the remaining balance on the basis of the output fee charging result. In addition, when a data usage amount is sent from the cache data measuring unit 331, the OCF 262 charges a fee on the basis of the usage fee and outputs a fee charging result to the second ABMF 266. The second ABMF 266 manages the remaining balance on the basis of the output fee charging result. In addition, the OCF 262 determines a usage fee for a user of the wireless terminal 340 on the basis of the respective remaining balances managed by the first ABMF 265 and the second ABMF and sends the usage fee to the billing domain 270.

Note that the first ABMF 265 is an example of a network data remaining balance management unit in the Claims. The second ABMF 266 is an example of a data remaining balance management unit in the Claims. The OCF 262 is an example of a fee charging management unit in the Claims.

In this way, remaining balances are separately managed by the first ABMF 265 and the second ABMF 266 according to usage of network data and usage of data held in the application server 330. In a case where the remaining balance managed by the second ABMF 266 is in deficit, usage of the data held in the application server 330 is stopped. Even in such a case, usage of the network data can be continued in a case where the remaining balance managed by the first ABMF 265 is in surplus. For example, sending receiving call data can be continued. With this configuration, usability can be improved.

Other components of the information processing system 10 are similar to the components of the information processing system 10 described in the first embodiment of the present technology, and hence a description of those components is omitted.

In this way, in the sixth embodiment of the present technology, two ABMFs separately manage a remaining balance according to usage of network data and manage a remaining balance according to usage of data held in an application server. With this configuration, usability can be improved.

<7. Seventh Embodiment>

In the above-described first embodiment, the fee charging device 260 charges a fee on the basis of usage of network data and charges a fee on the basis of usage of data held in the application server 330. In contrast, in a seventh embodiment of the present technology, there is further provided a cache data fee charging device configured to charge a fee on the basis of usage of data held in the application server 330. The seventh embodiment differs from the first embodiment in that different fee charging devices separately charge a fee on the basis of usage of network data and charge a fee on the basis of usage of data held in an application server.

[Configuration of Area for Charging a Fee]

Figure 12:
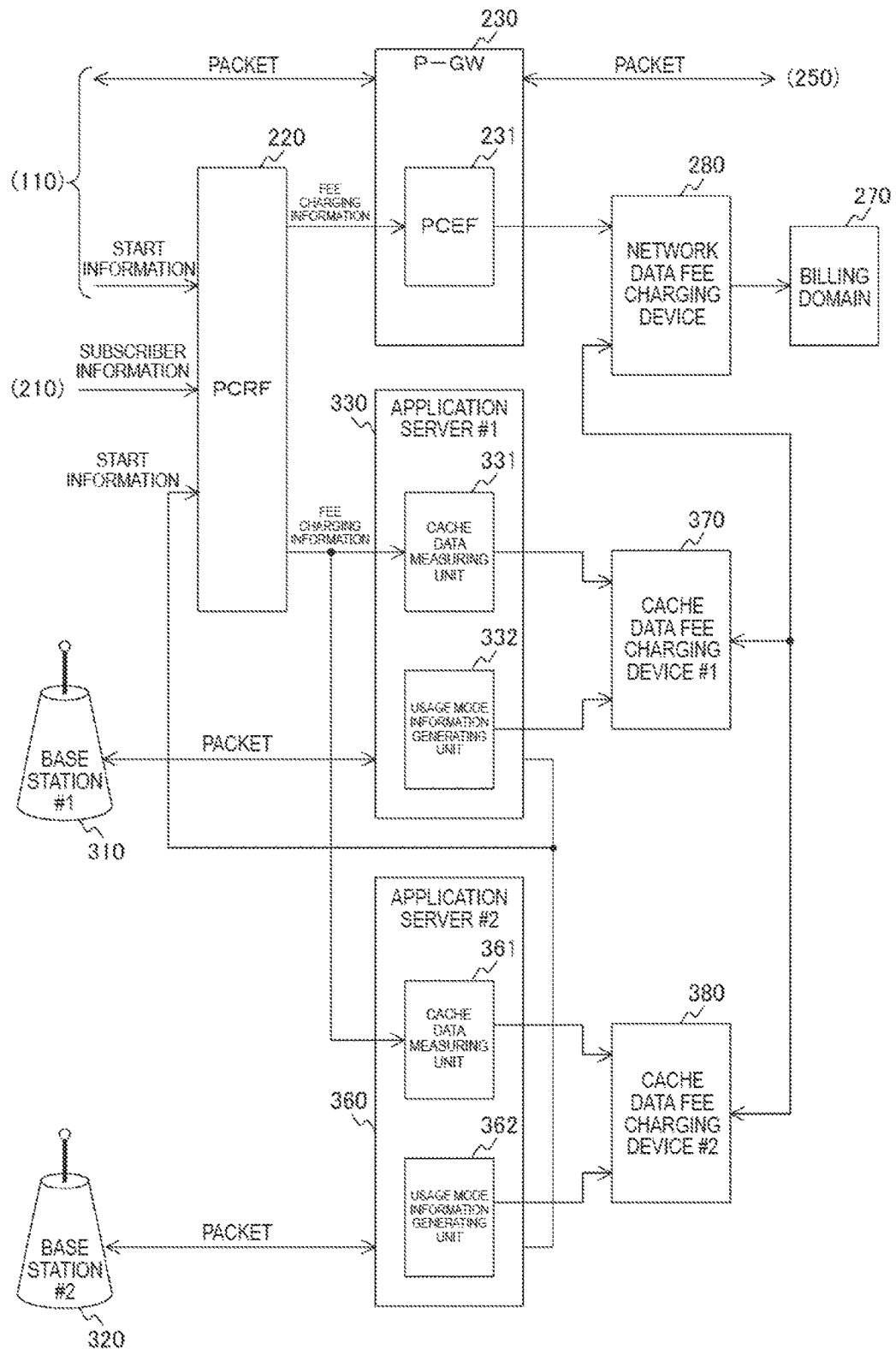
FIG. 12 is an illustration of an exemplary configuration of an area for charging a fee according to the seventh embodiment of the present technology.

FIG. 12 is an illustration of an exemplary configuration of an area for charging a fee according to the seventh embodiment of the present technology. The configuration of the area for charging a fee in FIG. 12 differs from the above-described configuration of the area for charging a fee in FIG. 2 in the following ways. The configuration of the area for charging a fee in FIG. 12 includes a network data fee charging device 280 in place of the fee charging device 260. In addition, the configuration of the area for charging a fee in FIG. 12 further includes an application server #2 (360) connected to a base station #2 (320) and cache data fee charging devices #1 (370) and #2 (380).

The network data fee charging device 280 charges a fee and manages a remaining balance on the basis of a usage amount of network data. In addition, the network data fee charging device 280 further manages a remaining balance that reflects a fee charging result by a cache data fee charging device to be described later.

The cache data measuring unit 331 of the application server #1 (330) in FIG. 12 sends a measured data usage amount to the cache data fee charging device #1 (370). In addition, the usage mode information generating unit 332 sends generated usage mode information to the cache data fee charging device #1 (370).

The application server #2 (360) includes a cache data measuring unit 361 and a usage mode information generating unit 362 and sends/receives data (packets) to/from the base station #2 (320). The cache data measuring unit 361 sends a measured data usage amount to the cache data fee charging device #2 (380). In addition, the usage mode information generating unit 362 sends generated usage mode information to the cache data fee charging device #2 (380).

The cache data fee charging device #1 (370) charges a fee for usage or the like of data held in the application server #1 (330). More specifically, a fee is charged on the basis of a data usage amount sent from the cache data measuring unit 331 and the usage mode information sent from the usage mode information generating unit 332.

The cache data fee charging device #2 (380) charges a fee for usage or the like of data held in the application server #2 (360). More specifically, a fee is charged on the basis of a data usage amount sent from the cache data measuring unit 361 and the usage mode information sent from the usage mode information generating unit 362.

In this way, in the seventh embodiment of the present technology, one cache data fee charging device is provided for every application server. A fee is charged on the basis of the data usage amount of each application server through providing the plurality of cache data fee charging devices. Because fee charging and remaining balance management are performed separately by the plurality of cache data fee charging devices and network data fee charging devices, fee charging processing can be dispersed. At this time, because the remaining balances are separately managed by the plurality of fee charring devices, the remaining balances need to be synchronized.

[Configuration of Network Data Fee Charging Device]

Figure 13:
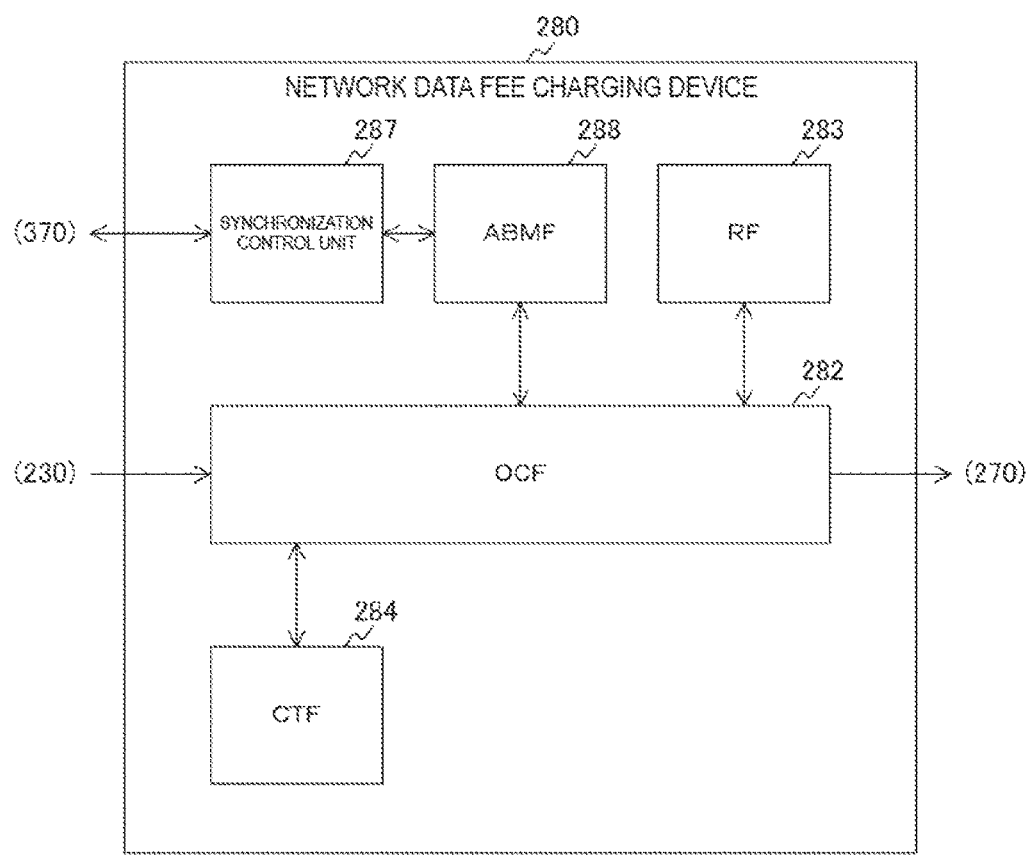
FIG. 13 is an illustration of an exemplary configuration of a network data fee charging device 280 according to the seventh embodiment of the present technology.

FIG. 13 is an illustration of an exemplary configuration of a network data fee charging device 280 according to the seventh embodiment of the present technology. The network data fee charging device 280 includes a synchronization control unit 287, an ABMF 288, an OCF 282, an RF 283 and a CTF 284.

The ABMF 288 manages a remaining balance according to fee charging based on the network data usage amount. In addition the ABMF 288 serials/receives remaining balance synchronization information which is information for synchronizing remaining balances using the synchronization control unit 287. The remaining balance synchronization information is sent/received to/from an ABMF 378 of a cache data fee charging device 370 using the synchronization control unit 287 and a synchronization control unit 377 of the cache data fee charging device 370 to be described later.

The synchronization control unit 287 sends/receives the above-described remaining balance synchronization information.

The OCF 282 charges a fee on the basis of the network data usage amount sent from the P-GW 230.

The configurations of the RF 283 and the CTF 284 are similar to those of the above-described RF 263 and CTF 264 in FIG. 3, and hence these configurations are not described.

Note that the network data fee charging device 280 is an example of a network data fee charging unit in the Claims.

[Configuration of Cache Data Fee Charging Device]

Figure 14:
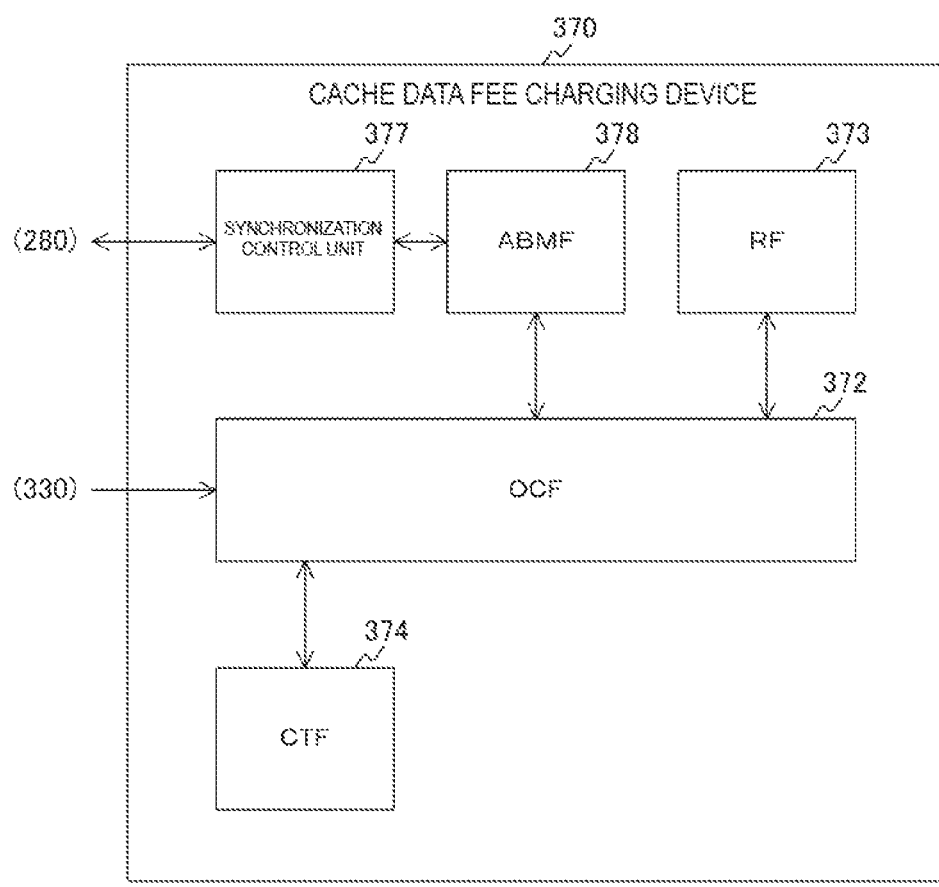
FIG. 14 is an illustration of an exemplary configuration of a cache data fee charging device 370 according to the seventh embodiment of the present technology.

FIG. 14 is an illustration of an exemplary configuration of the cache data fee charging device 370 according to the seventh embodiment of the present technology. The cache data fee charging device 370 includes the synchronization control unit 377, the ABMF 378, an OCF 372, an RF 373 and a CTF 374.

The ABMF 378 manages a remaining balance according to fee charging based on the data usage amount. In addition, the ABMF 378 sends/receives remaining balance synchronization information using the synchronization control unit 377.

The synchronization control unit 377 sends/receives the above-described remaining balance synchronization information.

The OCF 372 charges a fee on the basis of the network data usage amount and the usage mode information sent from the application server 330.

The configurations of the RF 373 and the CTF 374 are similar to those of the above-described RF 263 and CTF 264 in FIG. 3, and hence these configurations are not described.

The configuration of the cache data fee charging device 380 is similar to that of the above-described cache data fee charging device 370, and hence the configuration is not described. Note that the cache data fee charging devices 370 and 380 are examples of a data fee charging unit in the Claims.

[Synchronizing Remaining Balances]

The respective remaining balances managed by the above-described ABMF 288 and ABMF 378 in FIG. 13 can be synchronized in the following way. The ABMF 378 of the cache data fee charging device 370 sends the remaining balance managed by the ABMF 378 as the remaining balance synchronization information to the ABMF 288. In addition, the ABMF 378 can acquire a data usage amount from the OCF 372 and send the data usage amount as the remaining balance synchronization information. In a case where a number of packets is measured as the data usage amount, the measured number of packets can be sent as the remaining balance synchronization information. In a case where the managed remaining balance is in surplus, the number of packets can be sent as the remaining balance synchronization information after a certain number of packets have been accumulated.

On the other hand, the ABMF 288 of the network data fee charging device 280 manages a balance according to fee charging based on the network data usage amount and also adjusts the remaining balance managed by the ABMF 288 on the basis of the remaining balance synchronization information sent from the ABMF 378, and updates the remaining balance. Thereafter, the updated remaining balance is sent to the ABMF 378 as the remaining balance synchronization information. The ABMF 378 that has received the remaining balance synchronization information manages the received remaining balance as a new remaining balance.

[Synchronization Control Sequence for Remaining Balances]

Figure 15:
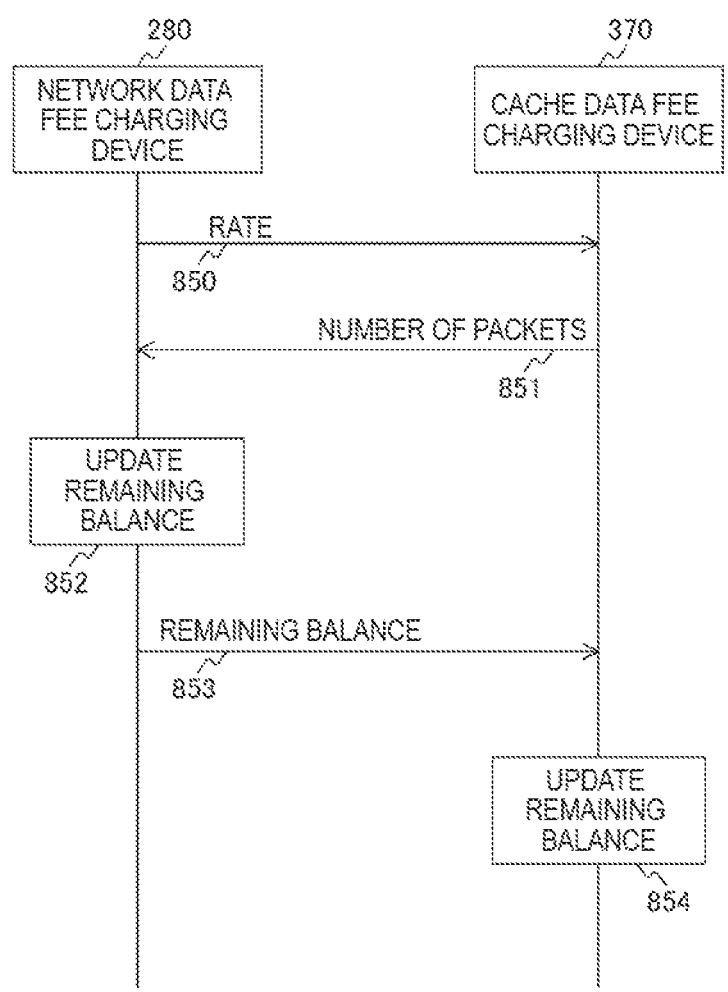
FIG. 15 is an illustration of an exemplary sequence for synchronous control of remaining balances according to the seventh embodiment of the present technology.

FIG. 15 is an illustration of an exemplary sequence for synchronous control of remaining balances according to the seventh embodiment of the present technology. FIG. 15 illustrates synchronization control of remaining balances between the network data fee charging device 280 and the cache data fee charging device 370. First, a rate is sent from the ABMF 288 of the network data fee charging device 280 (850). Next, a number of packets is sent from the ABMF 378 of the cache data fee charging device 370 as remaining balance synchronization information (851). On the basis of the sent number of packets, the remaining balance in the ABMF 288 of the network data fee charging device 280 is updated (852). Then, the ABMF 288 of the network data fee charging device 280 sends the updated remaining balance to the ABFM 378 of the cache data fee charging device 370 as the remaining balance synchronization information (853). The ABMF 378 of the cache data fee charging device 370 uses the sent remaining balance to update the remaining balance managed by the ABMF 378 (854).

The remaining balances can be synchronized by sending/receiving the remaining balance information. The frequency of sending/receiving the remaining balance information can be determined on the basis of the remaining balances. For example, in a case where the remaining balances are in surplus, the frequency of sending/receiving the remaining balance information is made relatively low to reduce processing load. In a case where a remaining balance runs low, the frequency of sending/receiving the remaining balance information is made relatively high. This is for accurately gasping the time at which a balance runs out and quickly stopping the user from using the data or the like.

In this way, in the seventh embodiment of the present technology, one cache data fee charging device is provided for each application server and remaining balances are managed according to usage of data held in an application server. With this configuration, the management of remaining balances can be dispersed and the load of managing remaining balances in the core network 200 can be reduced.

<8. Modification Example>

In the above-described embodiment, data is transmitted to the application server 330 via the P-GW 230 and the S-GW 250. In contrast, a modification example of the embodiment of the present technology differs from the first embodiment in that the application server 330 is connected to the network 100 via a dedicated P-GW and S-GW and data is transmitted using the P-GW.

[Configuration of Wireless Access Network]

Figure 16:
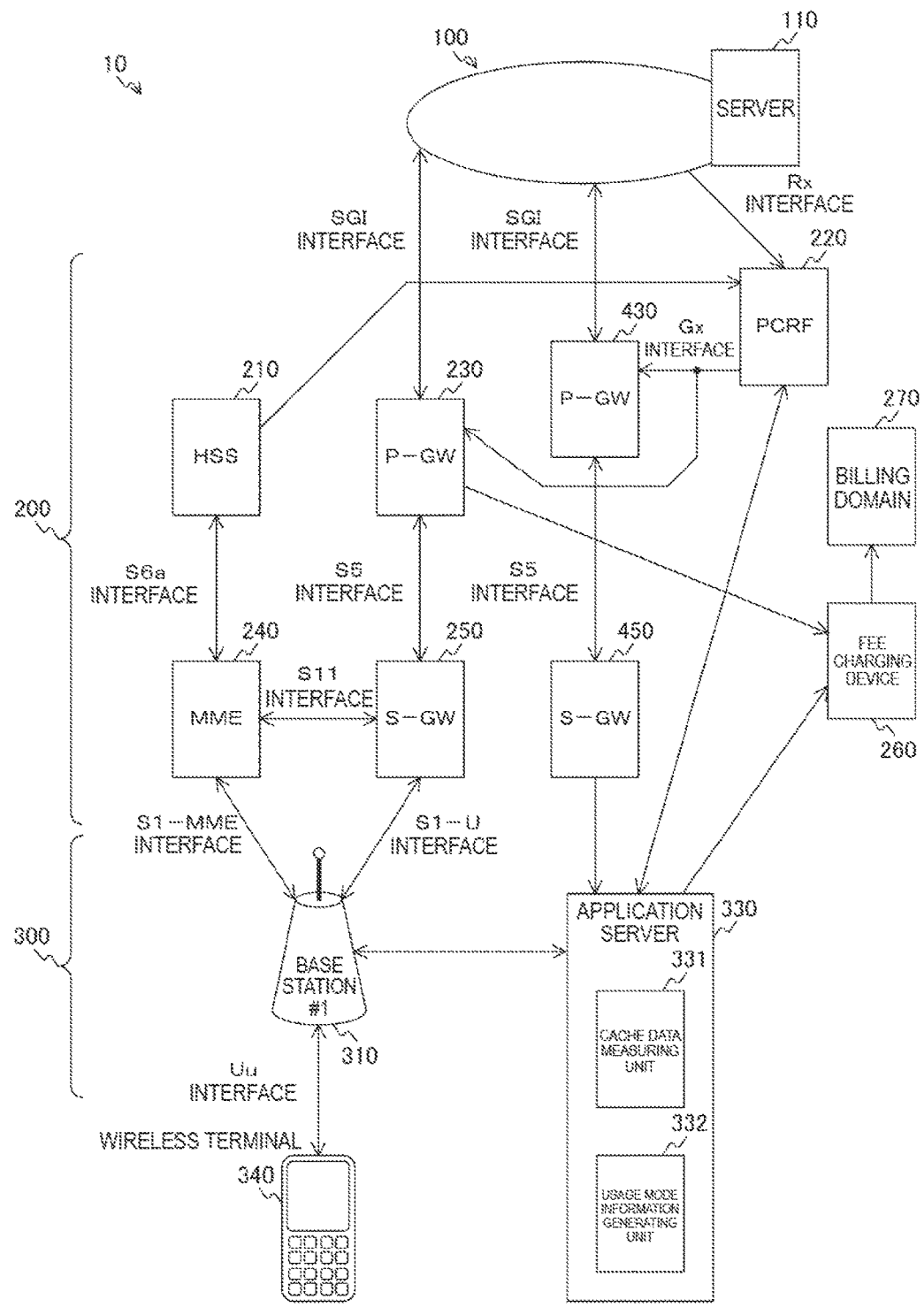
FIG. 16 is an illustration of an exemplary configuration of an information processing system 10 according to a modification example of an embodiment of the present technology.

FIG. 16 is an illustration of an exemplary configuration of the information processing system 10 according to the modification example of the embodiment of the present technology. The information processing system 10 in FIG. 10 differs from the above-described information processing system 10 in FIG. 1 in that the information processing system 10 further includes a P-GW 430 and a S-GW 450. The configuration of P-GW 430 and the S-GW 450 is similar to the configuration of the P-GW 230 and the S-GW 250 illustrated in FIG. 2, and hence a description of the configuration is omitted.

In the application server 330 in FIG. 16, data is sent from the server 110 via the P-GW 430 and the S-GW 450. Also in FIG. 16, the application server 330 generates the usage mode information and sends the usage mode information to the fee charging device 260. The fee charging device 260 charges a fee on the basis of the sent usage mode information.

In this way, according to the modification example of the embodiment of the present technology, a fee can be charged on the basis of the usage mode of the data using a dedicated P-GW 430 or the like for the application server 330, even in a case where data is transmitted to the application server 330 and held in the application server 330.

As described above, according to the embodiments of the present technology, an accurate fee can be charged for usage of data or the like held in an application server by charging a fee on the basis of usage mode information generated by a usage mode information generating unit.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)

An information processing system, including:
an application server configured to hold an application and data relating to the application;
a usage mode information generating unit configured to generate usage mode information which is information relating to a mode of use when the wireless terminal uses the held data;
network data usage amount measuring unit configured to measure a network data usage amount when the wireless terminal uses data on another network via a wireless access network connected to the wireless terminal; and
a fee charging unit configured to charge a fee on a basis of the measured network data Usage amount and charge a fee on a basis of the generated usage mode information.

(2)

The information processing system according to (1), in which the usage mode information generating unit generates information indicating that the data held in the application server is being used as the usage mode information.

(3)

The information processing system according to (2), in which the fee charging unit charges a fee using a rate lower than a rate when the wireless terminal uses data on another network in a case where information indicating that the data held in the application server is being used is generated as the usage mode information.

(4)

The information processing system according to (1), in which the usage mode information generating unit generates information indicating that data is being transferred to the application server as the usage mode information.

(5)

The information processing system according to (4), in which the fee charging unit charges a fee using a rate with a negative value in a case where information indicating that data is being transferred to the application server is generated as the usage mode information.

(6)

The information processing system according to (1), in which the usage mode information generating unit generates a continuous period of time after startup of the held application as the usage mode information.

(7)

The information processing system according to (6), in which the fee charging unit charges a fee using a rate that is changed according to a continuous period of time after startup of the application in a case where a continuous period of time after startup of the application is generated as the usage mode information.

(8)

The information processing system according to (1), in which the usage mode information generating unit generates a number of handover occurrences as the usage mode information.

(9)

The information processing system according to (1), in which the usage mode information generating unit generates information indicating that the application and the data held in the application server have not been used for predetermined period of time as the usage mode information.

(10)

The information processing system according to (1), in which the fee charging unit includes
a network data remaining balance management unit configured to manage a remaining balance of a usage fee paid in advance by a user of the wireless terminal according to fee charging based on the measured network data usage amount,
a data remaining balance management unit configured to manage a remaining balance of the usage fee according to fee charging based on the generated usage mode information, and
a fee charging, management unit configured to determine the usage fee for the user on a basis of respective remaining balances managed by the network data remaining balance management unit and the data remaining balance management unit.

(11)

An information processing system, including:
an application server configured to hold an application and data relating to the application;
a usage mode information generating unit configured to generate usage mode information which is information relating to a mode of use when the wireless terminal uses the held data;
a network data usage amount measuring unit configured to measure a network data usage amount when the wireless terminal uses data on another network via a wireless access network connected to the wireless terminal;
a network data fee charging unit configured to charge a fee on a basis of the measured network data usage amount; and
a fee charging unit configured to charge a fee on a basis of the generated usage mode information.

(12)

The information processing system according to claim 11, in which the data fee charging unit is provided for each of a plurality of the application servers and charges a fee for each of the plurality of application servers.

REFERENCE SIGNS LIST 10 information processing system
100 network
110 server
200 core network
210 home subscriber server (HSS):
220 policy and charging rule: function (PCRF)
230, 430 packet data network gateway (P-GW)
231 policy and charging enforcement function (PCEF)
240 mobility management entity (MME)
250, 450 serving gateway (S-GW)
260 fee charging device 261, 288, 178 account balance management function (ABMF)
267, 282, 372 online charging function (OCF)
263, 283, 373 rating function (RF)
264, 284, 374 charging trigger function (CTF)
265 first ABMF
266 second ABMF
270 billing domain
280 network data fee charging device
287, 377 synchronization control unit
300 wireless access network
310, 320 base station
330, 360 application server
331, 361 cache data measuring unit
332, 362 usage mode information generating unit
340 wireless terminal
370, 380 cache data fee charging device

The invention claimed is:

1. An information processing system, comprising:
   an application server configured to hold an application and data relating to the application;
   a usage mode information generating unit configured to generate usage mode information which is information relating to a mode of use of a wireless terminal, wherein the usage mode information comprises an indication of whether the wireless terminal is using the held data obtained from the application server or other data obtained via a wireless access network;
   a network data usage amount measuring unit configured to measure a network data usage amount when the wireless terminal uses the other data;
   a cache data usage amount measuring unit configured to measure a cache data usage amount when the wireless terminal uses the held data; and
   a fee charging unit configured to charge a fee on a basis of the measured network data usage amount, the cache data usage amount, and the usage mode information,
   wherein the fee is determined based on a first rate and the cache data usage amount when the usage mode information indicates that the wireless terminal is using the held data, and the fee is determined based on a second rate and the network data usage amount when the usage mode information indicates that the wireless terminal is using the other data, and the first rate is lower than the second rate, and
   wherein the fee charging unit charges a fee using a rate with a negative value in a case where the usage mode information indicates that data is being transferred to the application server, thereby compensating a user for uploading the transferred data to the application server.

2. The information processing system according to claim 1, wherein the usage mode information comprises information indicating that data is being transferred to the application server.

3. The information processing system according to claim 1, wherein the usage mode information comprises a continuous period of time after startup of the held application.

4. The information processing system according to claim 3, wherein the fee charging unit charges a fee using a rate that is changed according to the continuous period of time after startup of the application in a case where the continuous period of time after startup of the application is generated as the usage mode information.

5. The information processing system according to claim 1, wherein the usage mode information comprises a number of handover occurrences.

6. The information processing system according to claim 1, wherein the usage mode information comprises information indicating that the application and the data held in the application server have not been used for a predetermined period of time.

7. The information processing system according to claim 1, wherein the fee charging unit comprises:
   a network data remaining balance management unit configured to manage a remaining balance of a usage fee paid in advance by a user of the wireless terminal according to fee charging based on the measured network data usage amount,
   a data remaining balance management unit configured to manage a remaining balance of the usage fee according to fee charging based on the generated usage mode information, and
   a fee charging management unit configured to determine the usage fee for the user on a basis of respective remaining balances managed by the network data remaining balance management unit and the data remaining balance management unit.

8. An information processing system, comprising:
   an application server configured to hold an application and data relating to the application;
   a usage mode information generating unit configured to generate usage mode information which is information relating to a mode of use of a wireless terminal, wherein the usage mode information comprises an indication of whether the wireless terminal is using the held data or other data obtained via a wireless access network;
   a network data usage amount measuring unit configured to measure a network data usage amount when the wireless terminal uses the other data;
   a network data fee charging unit configured to charge a first fee on a basis of the measured network data usage amount when the usage mode information indicates that the wireless terminal is using the other data; and
   a fee charging unit configured to charge a second fee on a basis of the generated usage mode information when the usage mode information indicates that the wireless terminal is using the held data, wherein the second fee is determined using a lower rate than the first fee,
   wherein the fee charging unit determines the second fee using a rate with a negative value in a case where the usage mode information indicates that data is being transferred to the application server, thereby compensating a user for uploading the transferred data to the application server.

9. The information processing system according to claim 8, wherein the network data fee charging unit is provided for each of a plurality of the application servers and charges the fee for each of the plurality of application servers.

* * * * *